J. W. MOORE.
FERTILIZER MIXER.
APPLICATION FILED OCT. 23, 1919.
1,354,326.
Patented Sept. 28, 1920.
5 SHEETS—SHEET 3.
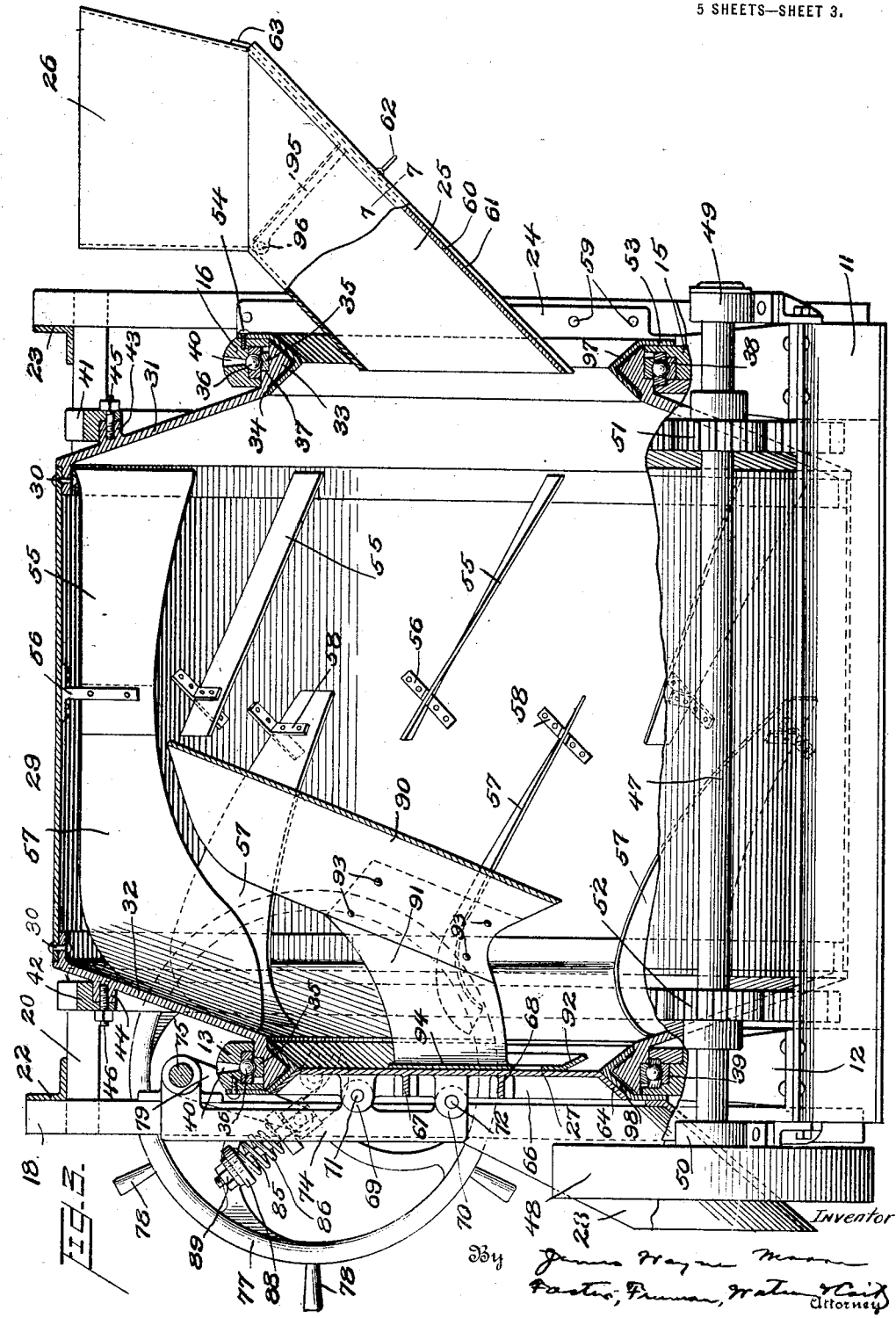

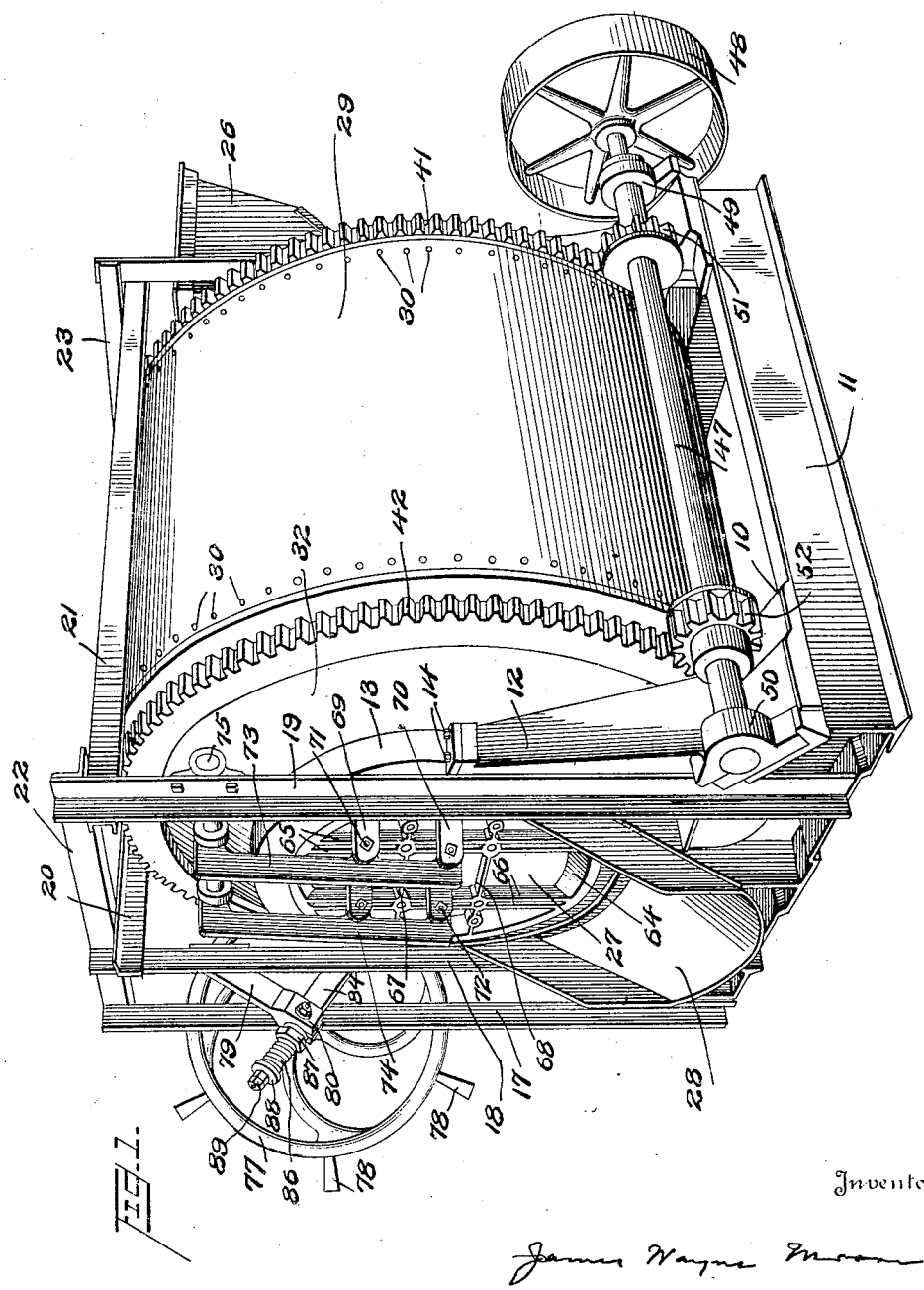

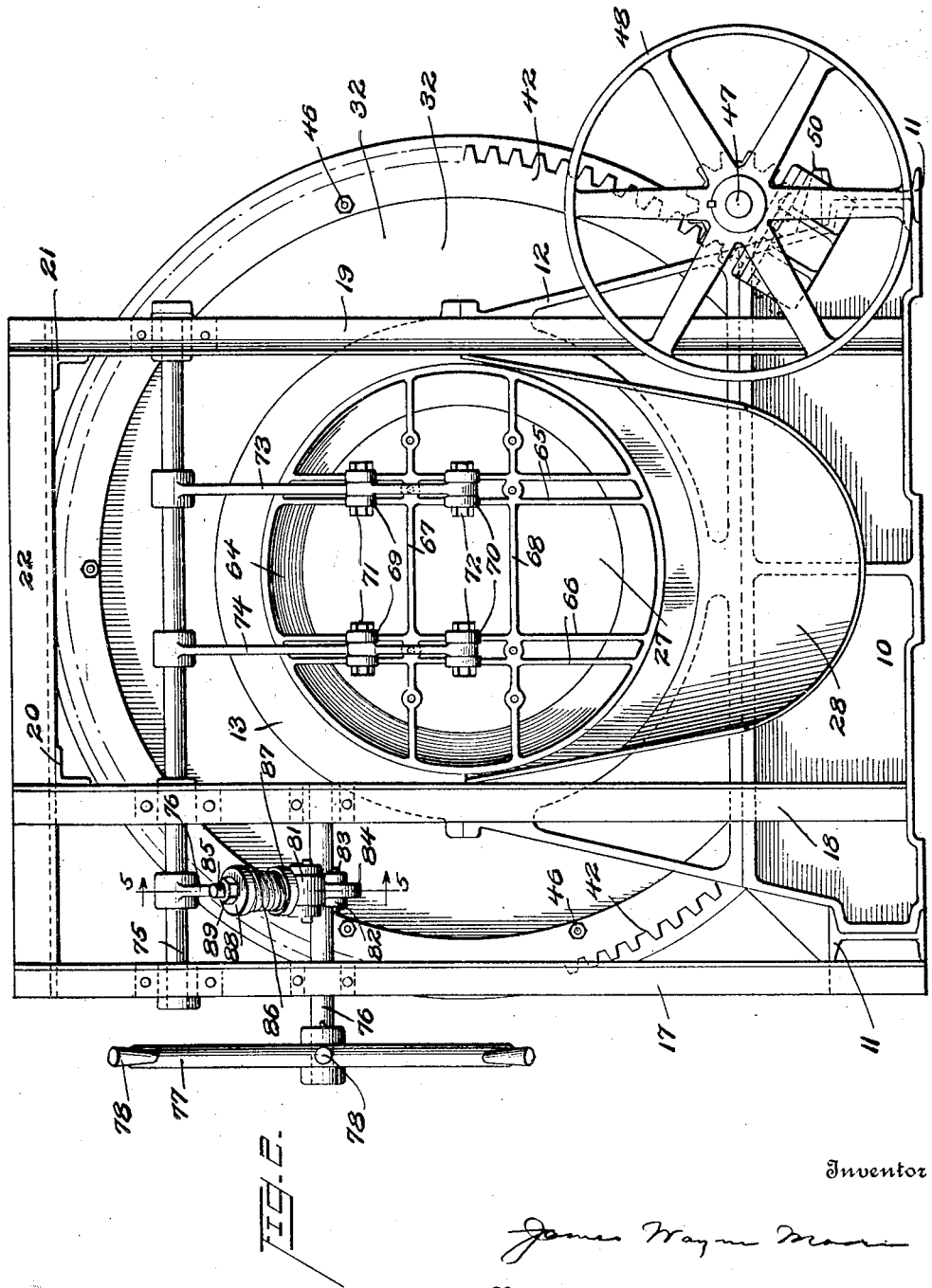

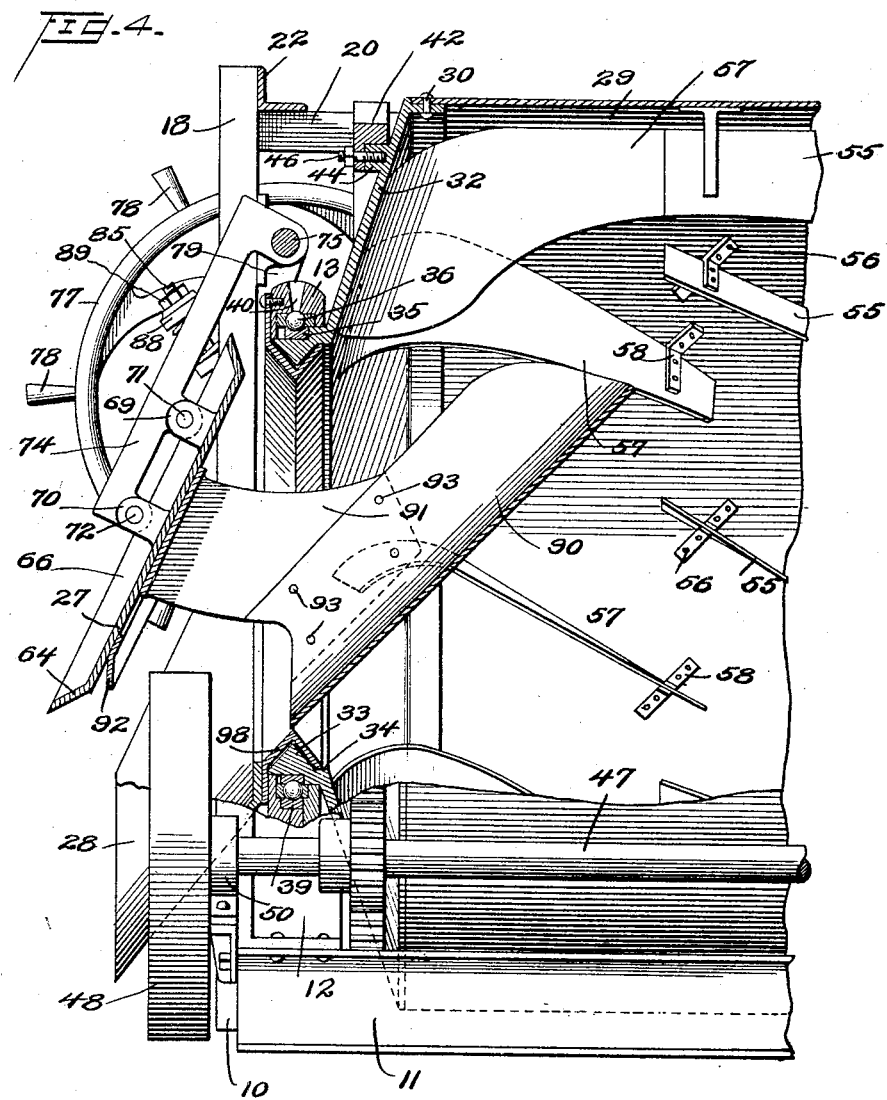
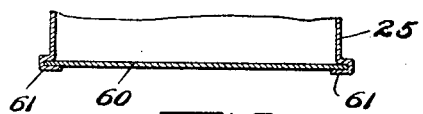

J. W. MOORE.
FERTILIZER MIXER.
APPLICATION FILED OCT. 23, 1919.
1,354,326.
Patented Sept. 28, 1920.
5 SHEETS—SHEET 5.
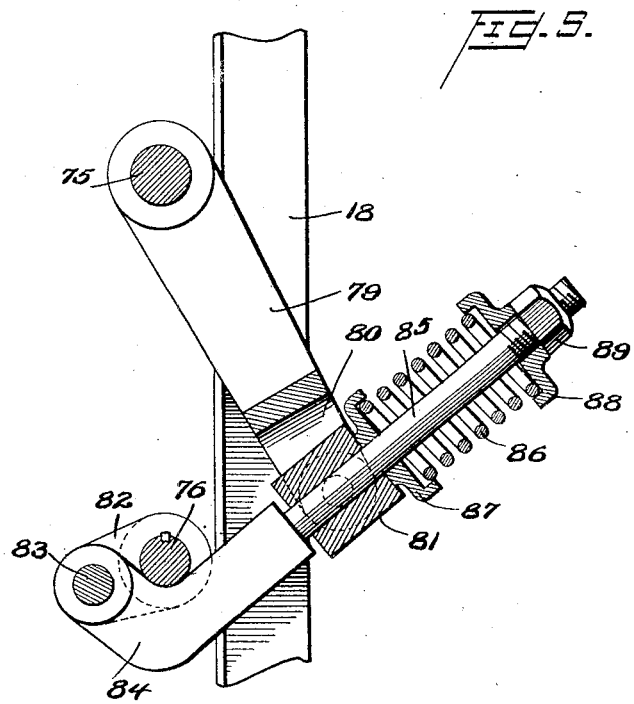
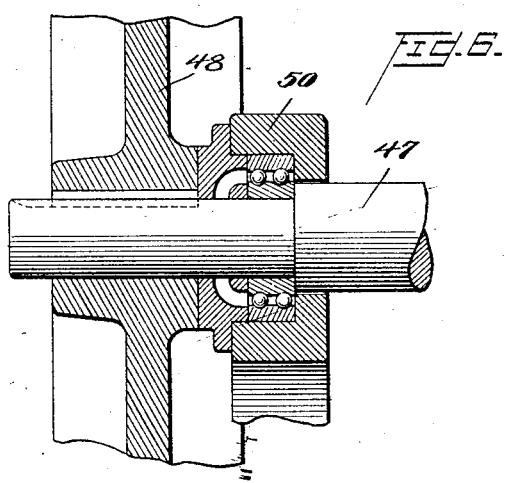

UNITED STATES PATENT OFFICE.

JAMES WAYNE MOORE, OF EAST POINT, GEORGIA, ASSIGNOR TO ATLANTA UTILITY WORKS, OF EAST POINT, GEORGIA, A CORPORATION OF GEORGIA.

FERTILIZER-MIXER.

1,354,326.  Specification of Letters Patent.  Patented Sept. 28, 1920.

Application filed October 23, 1919. Serial No. 332,625.

*To all whom it may concern:*

Be it known that I, JAMES WAYNE MOORE, a citizen of the United States, and residing at East Point, Fulton county, State of Georgia, have invented certain new and useful Improvements in Fertilizer-Mixers, of which the following is a specification.

This invention relates to mixing devices and was designed primarily for mixing batches of fertilizer. It embodies a rotary cylinder in which the mixing takes place, and it has been my object to produce a device of this type which will most thoroughly accomplish the mixing, which is strong and reliable in operation, which is simple in construction, and which avoids undue wear on the bearings and working parts and avoids clogging, which simplifies and improves the means for feeding and discharging material, which permits the supply or discharge of material while the cylinder is rotating, which avoids the escape of dust or the contents from the machine into the surrounding space when not discharging, which positively and properly discharges the material under the control of the operator without scattering, which provides easy access to the interior of the cylinder from the ends and which is so mounted and driven as to reduce the friction of the parts, power consumption and wear to a minimum, and to eliminate vibration. The novel features will be apparent from the following description taken in connection with the drawings. In the drawings—

Figure 1 is a perspective view of the device with the drive pulley shown at the inlet end;

Fig. 2 is an end view on the discharge side, the drive pulley in this view being at the discharge end;

Fig. 3 is a view partly in longitudinal section showing the device closed ready for use;

Fig. 4 is a longitudinal section of the discharge end with the closure open ready to discharge;

Fig. 5 is a view partly in section of the hand wheel shaft and toggle connection to the shaft which operates the closure;

Fig. 6 is a longitudinal section of the ball bearing for the drive shaft; and

Fig. 7 is a cross section of the rear wall of the inlet chute on the line 7—7 of Fig. 3.

In the embodiment of the invention shown in the drawings, there is a rectangular supporting base 10 which includes the side I-beams 11, and these parts may be made of sufficiently heavy cast iron and steel. Rigidly secured to the base near the discharge end there is a supporting bracket or pedestal 12 having an upper removable semi-circular portion 13 secured in place by flanges and bolts 14. This pedestal as shown tapers inwardly from the base up to the semicircular top portion and is so constructed that with the top portion it forms a circular opening to receive, support and furnish a bearing for the end of the drum as hereinafter explained. A similar pedestal or bracket 15 having a similar semicircular top portion 16 and including a similar bearing opening is mounted on the base at the inlet end. The base and the end pedestals are symmetrically formed on opposite sides. A supplementary frame is mounted on the base and includes in the form shown three vertical angle bars 17, 18 and 19 at each end, and the longitudinally connecting angle bars 20 and 21 at the top. There are also cross connecting bars 22 and 23 at the top. The vertical bars at the inlet end support a closure 24 for the drum, and the inclined inlet chute 25 which extends through that closure and which has a funnel shaped inlet 26 at its upper end. The vertical bars at the discharge end carry the circular closure or dust shield and its operating mechanism and the discharge chute 28, which is curved in cross section and leads downwardly at an angle from the central opening in the pedestal or bracket 12.

The mixing drum is made up of a sheet steel cylinder portion 29 which is connected at its ends by suitable means such as rivets 30 to the similar cast iron head portions 31, 32. These head portions are frusto-conical in shape, tapering inwardly and outwardly from the ends of the cylinder 29 and having circular contracted openings centrally at the ends of the drum. These head portions are provided at their inner edges with circular end flanges, the outer surfaces of which are in the plane of a cylinder parallel to the cylinder 29, and the inner surfaces of which are V-shaped in sectional view taken longitudinally of the drum leaving an enlarged V-shaped portion 33 having at its inner edge a shoulder 34. These end flanges have mounted in their outer faces the raceways 35 for the balls 36 of a ball bearing, those raceways fitting over the flanges from the end against a shoulder 37, the upper portion of which is on a level with the top of the raceway. These end flanges with their raceways fit in the bearing openings in the end standards or pedestals 12 and 15 and their semicircular top portions 13 and 16. The lower pedestal portions 12 and 15 have mounted on the inner face the ball raceways 38 and 39 and it will be understood that in mounting the drum in the end standards 12 and 15 the upper portions 13 and 16 may be removed, the drum placed in position in the semicircular openings in the lower portions and the upper portion, then secured in place. Openings 40 may be provided in the upper portion of 13 and 16 for lubricating the bearings.

In order to drive the drum two large ring gears 41 and 42 are secured to the heads 31, 32, a short distance from the outer periphery. For this purpose screw threaded lugs 43, 44 are formed on the heads and screw threaded bolts 45, 46, pass through the ring gears and engage the threads of said lugs. The outer periphery of the teeth of these gears extends almost as far outward as the periphery of drum 29. A drive shaft 47 which may carry a belt pulley 48 at either end, is mounted in ball bearings in brackets 49 and 50 and has secured thereto the pinions 51, 52 so formed and spaced as to mesh with the ring gears 41 and 42. The brackets 49, 50 are secured to the base at its ends, for instance, by bolts so that the drive shaft lies parallel to the drum along one side near the bottom. It will be observed that by reason of the symmetrical formation of the base, drum and drive shaft at both ends and on both sides, the drive shaft and bearing brackets may be secured along the drum on either side, and with the driving pulley at either end. The bearings used in the brackets 49, 50 are of special construction, being strong double row dust proof ball bearings, illustrated in Fig. 6. It will be observed that by the special form of double drive through the two pinions on the single drive shaft, applying power at both ends of the drum, vibration and binding strain will be prevented and the power will be properly distributed and applied so as to cause the rotation of the drum with a minimum of power and wear.

As another means to avoid binding, uneven strains and undue wear in the operation of the device, and to make it easy running and durable in operation and to avoid the necessity of stopping the machine to clean the bearing parts, I have provided the drum with dust shields both at the inlet end and the discharge end which serve to thoroughly protect the bearings. These dust shields 97, 98 are made of metal and since they are alike, a description of one will be sufficient. Shield 97 is annular in form having a flat face 53 fitting against the outer flat face of the standard 15 and its upper portion 16 around the opening and secured thereto by any suitable means such as screw 54. The dust shield, therefore is non-rotatable, being fastened to the frame. The inner portion is bent inward at an angle of about 45 degrees and then further bent at about 90 degrees forming a V-shaped slot depression on its outer side in which the V-shaped edge of the flange 33 fits. Sufficient space is left between the shield and V-shaped portion of the flange to avoid the friction in the rotation of the drum. The shield, however, as will be seen from Fig. 3, extends practically within the drum and out to the shoulder 34, thus thoroughly protecting rotary bearing part of the drum and its bearing from the material fed to the machine or discharged from it, or from dust and dirt.

Within and on the inner periphery of the drum commencing near the inlet end and extending part way toward the outlet, sheet metal strips 55 are mounted on edges extending longitudinally of the drum, but preferably at an angle as indicated in Fig. 3, and they may be held in place by any suitable means, as by brackets 56. These constitute blades, veins or flights which serve not only to cut up and to an extent mix the material near the inlet end and to gradually feed it toward the outlet, because of inclination or curved arrangement along the drum. Additional metal strips 57 are also placed on edge on the inner periphery of the drum preferably staggered with relation to the strips 55 and slightly overlapping them. These strips extend longitudinally at an angle toward the discharge end and may be fastened by brackets 58. These last mentioned strips, however, not only serve as veins or blades to cut, break up, and propel the material toward the discharge end but are so widened and curved at the end nearest the discharge as to form practically buckets or scoops which carry the material to the upper portion of the drum and then dump or throw it back to the bottom on previously thrown material in practically a continuous stream. For this purpose the extreme ends of these strips are curved until they are practically at right angles to the body portion. This results in a most thorough mixing at the discharge end of the drum. This mixing is further aided by means hereinafter specifically described which may be made to project into the drum through the discharge opening into the downward path of the material falling from the buckets, thus further cutting and disintegrating and mixing the material. The mixing may be continued as long as the operator desires or finds necessary, the discharge opening being kept closed during the mixing.

The closure 24 for the inlet end of the drum is secured to the upright members of the frame by any suitable fastening means 59, and is non rotatable and fits close against the outer flat face of the dust shield 53, thus making a dust tight closure for the inlet end of the drum. The inclined inlet chute 25 has its rear or lower wall 60 formed as a separate longitudinally sliding door mounted at its edges in grooves 61 formed by bending the side walls of the chute, as shown in Fig. 7. It is provided with a handle 62 for moving it and at its upper end is provided with a bent portion 63 fitting against the hopper 26 and serving as a stop to support it and to hold it against moving farther downward than desired. This removable door furnishes easy access to the interior of the drum for cleaning or repairs. The closure or dust shield 27 heretofore mentioned, as closing the discharge opening of the drum is circular in outline with its margin 64 bent outwardly at the same angle as the outer V-shaped portion of the dust shield 98, so as to fit close against the outer inclined face of the dust shield and extending to the apex of the V. When closed it normally makes a close dust tight joint with the dust shield, thus forming a non rotatable dust proof closure for the rotating discharge end of the drum. This closure may be provided on its outer face with two pairs of parallel vertical strengthening ribs 65, 66, and a pair of transverse strengthening ribs 67, 68. The ribs 65 and 66 are provided with projecting ears or flanges 69, 70, which are secured by bolts 71, 72 to the parallel arms 73, 74, these arms being secured at their upper end to the shaft 75 mounted in bearings carried by the uprights 17 and 18. The arms 73, 74 and the shaft 75, therefore constitute the means for supporting the closure 27 and it can be moved outwardly to open the discharge by turning the shaft 75 in one direction, and in the same way can be moved in the other direction to closed position.

The present invention includes special and novel means for turning the shaft 75 to open and close the discharge and to lock the closure or dust shield 27 in closed position even where it does not make close contact with the dust shield 98 by reason of some obstruction interposed between the normally meeting portions of those parts. The special means embodies a supplemental rotary shaft 76 mounted parallel to and below shaft 75 in bearings secured to the uprights 18, 19 as seen in Fig. 2 and carrying on its end the hand operating wheel 77 with radial projections 78. A lever arm 79 is secured to shaft 75 and has a bifurcated end 80 in which is pivoted the block 81 provided with a central passageway through it, as shown in Fig. 5. The shaft 76 has secured to it a short arm 82 having a bifurcated outer end with a pivot pin 83 extending through it and on this pin is mounted the end of an elbow shaped toggle lever 84. That toggle lever has a reduced cylindrical end 85 passing through the opening in block 81 and making sliding connection with it, and beyond the block a coiled compression spring 86 surrounds the part 85 bearing at the inner end on a cup 87 loosely surrounding 85 and resting on block 81 and its outer end against cup 88 held in place by nut 89. When the hand wheel 77 and its lever 76 are so turned as to close the discharge opening, the parts occupy the position shown in Fig. 5 with the crotch of the elbow in lever 84 resting against shaft 76. At that time the pivot connection 83 is in or beyond a line extending from shaft 76 to the pivot connection in block 81 and since the spring 86 is then under some compression exerting a pull on the lever 34, the parts are locked. In other words, the toggle lever has passed the dead center and can not return without external force because of the tension of the spring tending to turn it farther, and it can not go any farther because of contact with shaft 76. The flexible connection furnished by the spring 86 enables the hand wheel to turn the toggle to the locked position even when there is an obstruction which does not permit the entire closing of the dust seal 27 on the normal movement of the arms 79. In that case the spring 86 is simply compressed more than in normal operation.

Mounted on the inner face of the closure 27 for the discharge, there is a device which performs one function or purpose when the discharge is closed and a different function when the discharge outlet is open. It is what may be called a movable chute or scoop 90 made of a sheet of metal bent transversely forming in a sense a straight trough connected to closure 27 by arms 91. The arms 91, as shown are made of cast iron and are secured at one end to the sides of the scoop by bolts or rivets 93 and at the other end are connected to a plate 94 which is bolted to the closure 27. When the dust seal 27 is closed, as shown in Fig. 3, the inner tip end of the scoop 90 projects upwardly and is in the path of material being thrown down by the scoop-like ends of the veins 57 and, therefore, it serves to cut and disintegrate that material still further and the arms 91 aid in the operation. When the dust seal or closure 27 is open, however, as shown in Fig. 4, the upper tip end of the scoop 90 extends farther into the drum and that scoop then serves to catch the falling material in the trough or chute which it forms and to guide it downwardly toward the discharge opening under the influence of gravity. At that time the lower tip end of the scoop 90 projects slightly out through the discharge opening and thus the material sliding down it is delivered to the chute 28 extending downwardly from the discharge opening outside of the drum. The chute 28 is secured around the lower edge of the discharge opening to the outer face of the dust shield 98, as shown in Figs. 3 and 4.

Secured to the inner face of the closure 27 near the bottom, there is a metal apron 92 inclined inwardly and downwardly to direct the falling material away from the lower portion of the discharge opening during the mixing.

The inlet chute 25 may be provided with a closure 95 hinged or pivoted at 96 and adapted to be turned up out of the way by a projecting handle, when it is desired to supply material to the interior of the drum.

Having thus described the invention what is claimed as new and desired to be secured by Letters Patent is:

1. In a device of the class described the combination of a rotary mixing drum having a circular discharge outlet, of a movable non-rotatable door fitting said outlet when in closed position and a downwardly and inwardly inclined apron secured to said door on its inner lower portion to protect the bearing connection between said drum and door from falling material.

2. In a mixing device the combination with a stationary frame of a revoluble drum having an opening at one end for the admission of material and an opening at the other end for discharge of material, blades or flights secured within said drum extending obliquely from the inlet end part way toward the discharge end, staggered additional blades or flights extending in substantially the same direction from the ends of said first mentioned blades toward the discharge end and having their ends nearest the discharge bent on a curve to substantially right angles to act as scoops to lift the material and throw it back on itself, a movable door for the discharge opening adapted to remain stationary during the rotation of the drum and a member secured to and movable with said door standing, when the door is closed, in the path of the material falling from the curved portions of said blades whereby it will cut or disintegrate such material and adapted when the door is open to receive the said falling material and direct it out through the discharge opening.

3. In a mixing device the combination with a stationary supporting frame of a revoluble drum having an opening at one end for the admission of material and an opening at the other end for discharge of material, blades or flights within said drum for engaging and mixing the material supplied to it and gradually conveying it from the inlet end to the discharge end, a non rotatable closure for the discharge end, a scoop secured to the inner face of said closure and movable therewith and, when the door is closed, adapted to be struck by and to disintegrate falling material within the drum and when the door is open to receive and direct the falling material out through the discharge opening.

4. In a mixing device the combination with a stationary supporting frame of a revoluble drum having an opening at one end for the admission of material and an opening at the other end for discharge of material, blades or flights within said drum for engaging and mixing the material supplied to it and gradually conveying it from the inlet end to the discharge end, a non rotatable closure for the discharge end, a scoop secured to the inner face of said closure adapted when the closure is open to receive the falling material within the drum at the discharge end and convey it out through the discharge opening.

5. The combination with a chamber having a discharge opening, of a hinged closure for said opening, an operating arm and shaft for said closure the said arm being connected to said closure at one end and being rigidly secured to said shaft at the other end, an operating hand-wheel and intermediate toggle connection for turning said shaft and moving said closure.

6. The combination with a chamber having a discharge opening, of a hinged closure for said opening, an operating arm and shaft for said closure the said arm being connected to said closure at one end and being rigidly secured to said shaft at the other end, an operating hand-wheel and intermediate toggle connection for turning said shaft and moving said closure, the said toggle connection being such as to automatically lock to hold the door closed when the hand wheel is turned to closed position.

7. The combination with a chamber having a discharge opening, of a hinged closure for said opening, an operating arm and shaft for said closure, the said arm being connected to said closure at one end and being rigidly secured to said shaft at the other end, an operating hand-wheel and intermediate toggle connection for turning said shaft and moving said closure, the said toggle connection being such as to automatically lock to hold the door closed when the hand wheel is turned to closed position, a spring in said toggle connection permitting the movement of the hand wheel to closed locked position even where a slight obstruction prevents a complete shutting of the closure.

8. In a device of the class described the combination with a chamber having a door opening of a hinged non rotatable door or closure for the said opening, means for opening and closing said door embodying a hand wheel and intermediate connections so constructed as to lock the door against opening when the hand-wheel is turned to closed position.

9. In a device of the class described the combination with a chamber having a door opening of a hinged non rotatable door or closure for the said opening, means for opening and closing said door embodying a hand wheel and intermediate connections so constructed as to lock the door against opening when the hand-wheel is turned to closed position, and a spring in said intermediate connections permitting the hand wheel to be turned to closed position and the door locked against opening even when the door is prevented by any obstruction from entirely closing.

10. In a mixing device the combination with a stationary supporting frame of a revoluble drum having an opening at one end for the admission of material and an opening at the other end for discharge of material, of bearings for said drum at its ends, a circumferential toothed gear on said drum near each end and a drive shaft having secured thereto pinions engaging said toothed gears on the drum to drive the same.

11. In a mixing device the combination with a fixed frame of a revoluble mixing drum having end bearings in said frame and having an inlet opening at one end and a discharge opening at the other end, a circumferential toothed gear on said drum near each end, brackets containing bearings secured to said frame at its ends in line on one side and a drive shaft working in said bearings and carrying spur gears engaging the toothed gears on the drum.

12. In a mixing device the combination with a fixed supporting frame of a revoluble mixing drum having bearings in said frame, a circumferential toothed gear carried by said drum near each end, a drive shaft adapted to lie parallel to and close along said drum carrying two fixed pinions properly spaced to mesh with the circumferential gears on said drum and a plurality of bearing brackets on said shaft adapted to be secured to said frame on either side of said drum with the pinions in mesh with the gears or to be reversed in position on the same side of said drum.

13. In a mixing device the combination with a fixed base of rectangular outline, of bearing brackets secured to said base at its ends extending inwardly and upwardly from the margins of said base and provided with circular bearing openings at their upper ends, a revoluble cylindrical drum having contracted ends provided exteriorly with bearing surfaces fitting the bearing openings of said brackets and provided with gears secured to the contracted portion at the ends and extending out substantially to the periphery of the drum, a drive shaft having a driving pulley at one end and having secured thereto two pinions so spaced as to mesh with said gears, and two bearing brackets for said shaft each adapted to be secured to either side of either of said brackets near its base whereby the drive shaft may be placed on either side of the drum and with the pulley at either end.

14. In a mixing device the combination with a stationary supporting frame of a revoluble drum having an opening at one end for the admission of material, and an opening at the other end for discharge of material, of bearings for supporting and permitting the rotation of said drum surrounding and immediately adjacent said end openings, and stationary dust shields extending beyond said bearings and within the drum over and close to the margins of the end openings to protect the bearings from dust and dirt.

15. In a mixing device the combination with a stationary supporting frame of a revoluble drum having an opening at one end for the admission of material and an opening at the other end for discharge of material, of antifriction bearings for said drum adjacent the margin of the end openings and a stationary dust shield extending across the end of the drum wall at the opening and passing within the opening and out toward the periphery within the drum.

16. In a mixing device the combination with a revoluble drum having tapered or contracted ends and end openings, raceways for antifriction rollers secured externally in said contracted ends, a frame for supporting said drum having end standards provided with circular openings surrounding said contracted ends and provided with raceways, antifriction rollers interposed between said raceways on the drum and said raceways on the standards and means for rotating said drum in said frame.

17. In a mixing device the combination with a revoluble drum having tapered or contracted ends with end openings, the contracted end portion having an interior surface V-shaped on a longitudinal section through the drum and an outer surface constructed as a raceway for antifriction rolling elements, end standards for supporting said drum provided with circular openings surrounding said contracted ends, antifriction rolling elements between said contracted end and said standard, and a dustshield secured to the outer face of the standard around the opening and extending up over the V-shaped surface and down within the drum but separated from said surface sufficiently to avoid undue friction.

18. In a mixing device the combination with a revoluble drum having tapered or contracted ends and end openings, a frame for supporting said drum having end standards provided with circular openings surrounding said contracted ends, anti friction bearings between said standards and said ends, a dust shield secured to one of said standards and projecting across and within the contracted end of said drum, and means for rotating said drum.

19. In a mixing device the combination with a revoluble drum having contracted ends with end openings, means for supporting and rotating said drum, a non rotatable closure for the inlet openings of said drum fitting across said opening, a stationary supply chute extending through an opening in said closure to convey material into said drum, a portion of said chute being removable permitting a view of and access to the interior of said drum through the opening in the closure.

20. In a mixing device the combination with a revoluble drum having contracted ends with end openings, means for supporting and rotating said drum, a non rotatable closure for the inlet opening of said drum fitting across said opening, a stationary supply chute extending downwardly at an angle through an opening in said closure to convey material into said drum, the lower wall of said chute being movable with reference to the balance of the chute to furnish access to the interior of the drum through the opening in said closure.

21. In a mixing device the combination with a revoluble drum having contracted ends and end openings, fixed supporting standards having circular opening surrounding and forming bearings for said contracted ends, a dust shield secured to a standard around the opening and projecting over and within the contracted end, and a non-rotatable closure fitting against said dust shield.

22. In a mixing device the combination with a revoluble drum having contracted ends and end openings, fixed supporting standards having circular openings surrounding and forming bearings for said contracted ends, fixed marginal dust shields secured to said standards around said openings and projecting across the contracted ends of said drum, a fixed closure provided with an inlet passageway fitting said dust shield at the inlet end and a non rotatable adjustable closure for the outlet end fitting said dust shield at the outlet end when in closed position.

23. In a mixing device the combination with a revoluble drum having contracted ends and end openings, fixed supporting standards having circular openings surrounding and forming bearings for said contracted ends, a stationary marginal dust shield extending across the bearing joint and over and close against the contracted discharge end of the drum, a non rotatable discharge door closely fitting said dust shield on the outside and closing said outlet and means for moving said door to open or closed position.

In testimony whereof I affix my signature.

JAMES WAYNE MOORE.